United States Patent [19]

Matweecha

[11] 3,729,175
[45] Apr. 24, 1973

[54] BLENDING APPARATUS

[75] Inventor: David M. Matweecha, Bethlehem, Pa.

[73] Assignee: Fuller Company, Catasaugua, Pa.

[22] Filed: Mar. 12, 1971

[21] Appl. No.: 123,520

[52] U.S. Cl. ............................... 259/4, 259/DIG. 17
[51] Int. Cl. ......................................... B01f 13/02
[58] Field of Search .................. 259/1 R, 4, DIG. 17; 34/57 A, 10

[56] References Cited

UNITED STATES PATENTS

| 3,178,830 | 4/1965 | Mark | 34/57 A |
| 3,159,383 | 12/1964 | Van Munster | 259/4 |
| 2,665,035 | 1/1954 | Schemm | 259/4 X |
| 2,550,722 | 5/1951 | Rollman | 34/10 X |

FOREIGN PATENTS OR APPLICATIONS 1,057,425   5/1959   Germany ................................. 259/4

*Primary Examiner*—Robert W. Jenkins
*Assistant Examiner*—Alan I. Cantor
*Attorney*—Jack L. Prather and Frank H. Thomson

[57] ABSTRACT

A blending apparatus for particulate material which includes a vessel having a conical portion at its lower end. A gas permeable divider means is mounted in the conical portion of the vessel dividing the vessel into a material chamber and a plenum chamber. A second plenum chamber is defined in the bottom of the vessel and has a gas permeable wall facing the inside of the vessel. At least a pair of coaxially aligned blending columns are mounted within the blending silo. One of the columns may be smaller in diameter than the other column and positioned below and extend into the bottom of the other column. The larger column may be divided into a pair of columns which are separated from each other so that less than a full batch of material may be blended.

13 Claims, 6 Drawing Figures

INVENTOR
DAVID M. MATWEECHA
ATTORNEY

Patented April 24, 1973
3,729,175
3 Sheets-Sheet 2
FIG.2.
FIG.3.
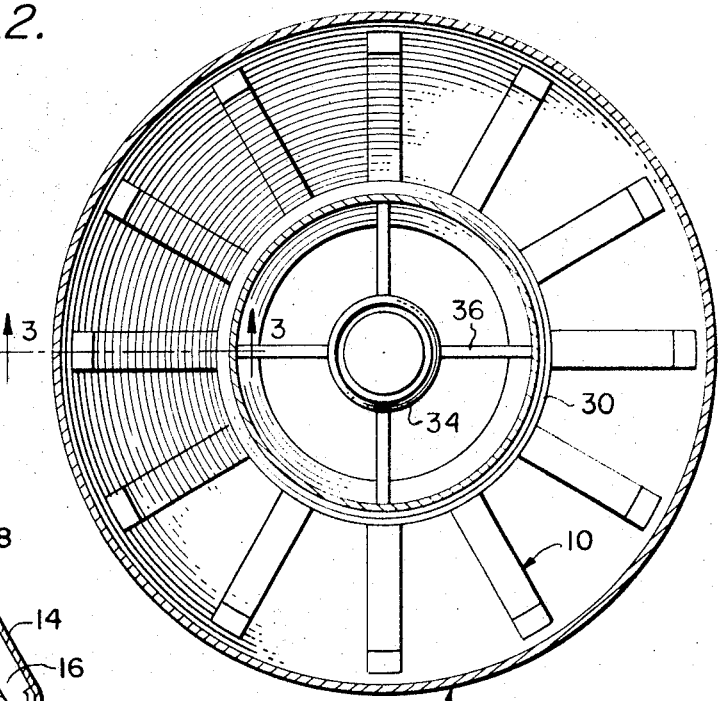
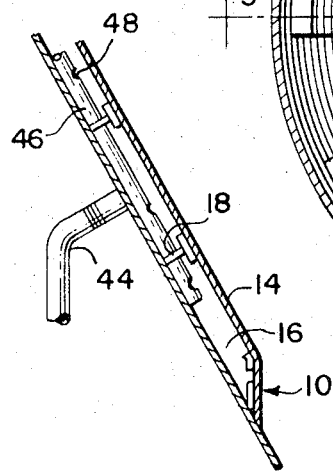
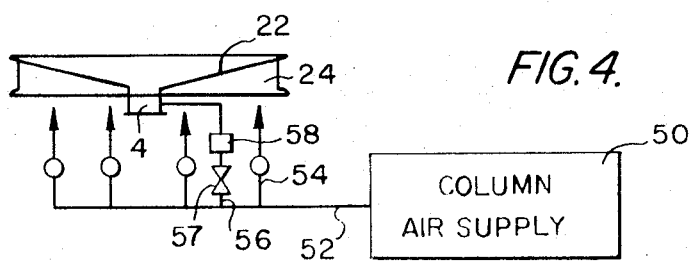
FIG.4.
FIG.5.
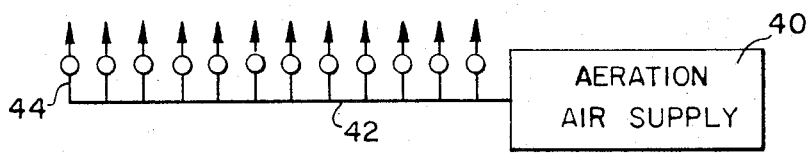
INVENTOR
DAVID M. MATWEECHA
BY Frank H Thomson
Jack L. Prather
ATTORNEY

BLENDING APPARATUS

BACKGROUND OF THE INVENTION

The present invention relates to apparatus for blending particulate material and in particular to an air lift or column blending apparatus. The present invention is particularly well adapted for use in blending large quantities of particulate material.

Various systems and apparatus for blending particulate material have been known prior to the present invention. One such prior apparatus is that shown in U.S. Pat. No. 2,844,361 wherein the blending silo includes an aerated bottom which is divided into a plurality of sections. Gaseous fluid such as air under pressure is supplied to each of the sections to aerate the material in the blending silo. Air at a high velocity is supplied to one of the sections and is pulsed. The high velocity air causes the material above that section to be fluidized. Material above the section which is supplied with high velocity air spills onto the top of material in the other sections and material in such other sections flows into the fluidized section. Suitable valving and control apparatus is provided to switch the section which is supplied with high velocity air so that complete blending of material in the silo is achieved. This type of particulate material blending apparatus performs well when blending substantially uniform size materials. However, this type of blending apparatus does not perform well when the particle sizes of the materials to be blended are diverse. Actually, the blender tends to segregate the larger particles from the smaller particles instead of blending them.

An air lift or column blending apparatus is shown in U.S. Patent application Ser. No. 22,640, filed Mar. 25, 1970, which is assigned to the Assignee of the present invention. In such patent application, there is shown a blending silo having a gas permeable divider means dividing the silo into a material chamber and a plenum chamber. Gas such as air under pressure is supplied to the plenum chamber and passes through the divider means to aerate material in the material chamber. A blending column is mounted in the silo. Air at a velocity higher than that which passes through the gas permeable divider is directed into the bottom of the column so that material in the silo will flow upwardly through the column and spill onto the top of the material in the remainder of the silo. At the same time, material around the sides of the silo flows into the bottom of the blending column. The blending action is similar to a percolator. This type of blender is particularly well adapted to blending materials having a wider range of particle sizes than can be blended in the apparatus shown in U.S. Pat. No. 2,844,361.

An improvement over the invention disclosed in U.S. Patent application Ser. No. 22,640, filed Mar. 25, 1970, now U.S. Pat. No. 3,647,188 is shown in my copending patent application Ser. No. 94,137, filed Dec. 1, 1970, now U.S. Pat. No. 3,648,985 wherein the blending column is tapered along its full length so that material flowing upwardly through the blending column flows at a substantially, continuously increasing velocity.

For many blending applications, the apparatus shown in my prior copending patent application is adequate and the concept of the invention disclosed in such application is incorporated in the present invention. When it is desired to blend large quantities of material at one time, the blending silo must be large, and consequently, the blending column must also be large. For such large capacity silos, it has been found that a single blending column is inadequate. The multiple column arrangement shown in prior U.S. Patent application Ser. No. 22,640, filed Mar. 25, 1970, has not been acceptable. The large blending column which is required for large capacity silos cannot be placed sufficiently close to the bottom of the silo to adequately blend material near the bottom of the silo. A single blending column in a large capacity blending silo will often result in an area of unblended material near the bottom of such silo.

An additional shortcoming of prior blenders of the type set forth in my prior copending application is that such blenders are only capable of blending material within a very narrow volumetric capacity range. If it is only desired to blend a portion such as one-half of the volumetric design capacity of the silo, complete blending of the material cannot be achieved.

SUMMARY

It is, therefore, the principal object of this invention to provide a pulverulent material blending apparatus which is capable of being used where it is desired to blend large quantities of material.

It is another object of this invention to provide a particulate material blending apparatus which will insure a thorough blending of all material in the blending silo.

It is still another object of this invention to provide a particulate material blending apparatus which is capable of thoroughly blending material when it is desired to blend less than a full batch of material.

It is a further object of this invention to provide a pulverulent material blending apparatus which is capable of blending large capacities of material and may also be used for blending less than a full batch of material.

In general, the foregoing and other objects of this invention will be carried out by providing apparatus for blending particulate material comprising an upright vessel having a material inlet and a material outlet; gas permeable divider means mounted in said vessel and dividing said vessel into a material chamber and a plenum chamber; at least two substantially coaxially aligned blending columns mounted in said material chamber and spaced from said divider means; means for supplying gaseous fluid under pressure to said plenum chamber for passage through said divider means for aerating material in said material chamber; and means for supplying gaseous fluid under pressure into the bottom of at least one of said blending columns at a velocity greater than the gaseous fluid which passes through said divider means for aerating material whereby material flows upwardly through said blending columns.

BRIEF DESCRIPTION OF THE DRAWINGS

The invention will be described in connection with the annexed drawings wherein:

FIG. 2 is a sectional view taken on the line 2—2 of FIG. 1, looking in the direction of the arrows;

FIG. 3 is a sectional view taken on the line 3—3 of FIG. 2 showing a portion of the aeration apparatus employed by the present invention;

FIGS. 4 and 5 are schematic views of the aeration apparatus of the present invention.

DESCRIPTION OF THE PREFERRED EMBODIMENT

Figure 1:
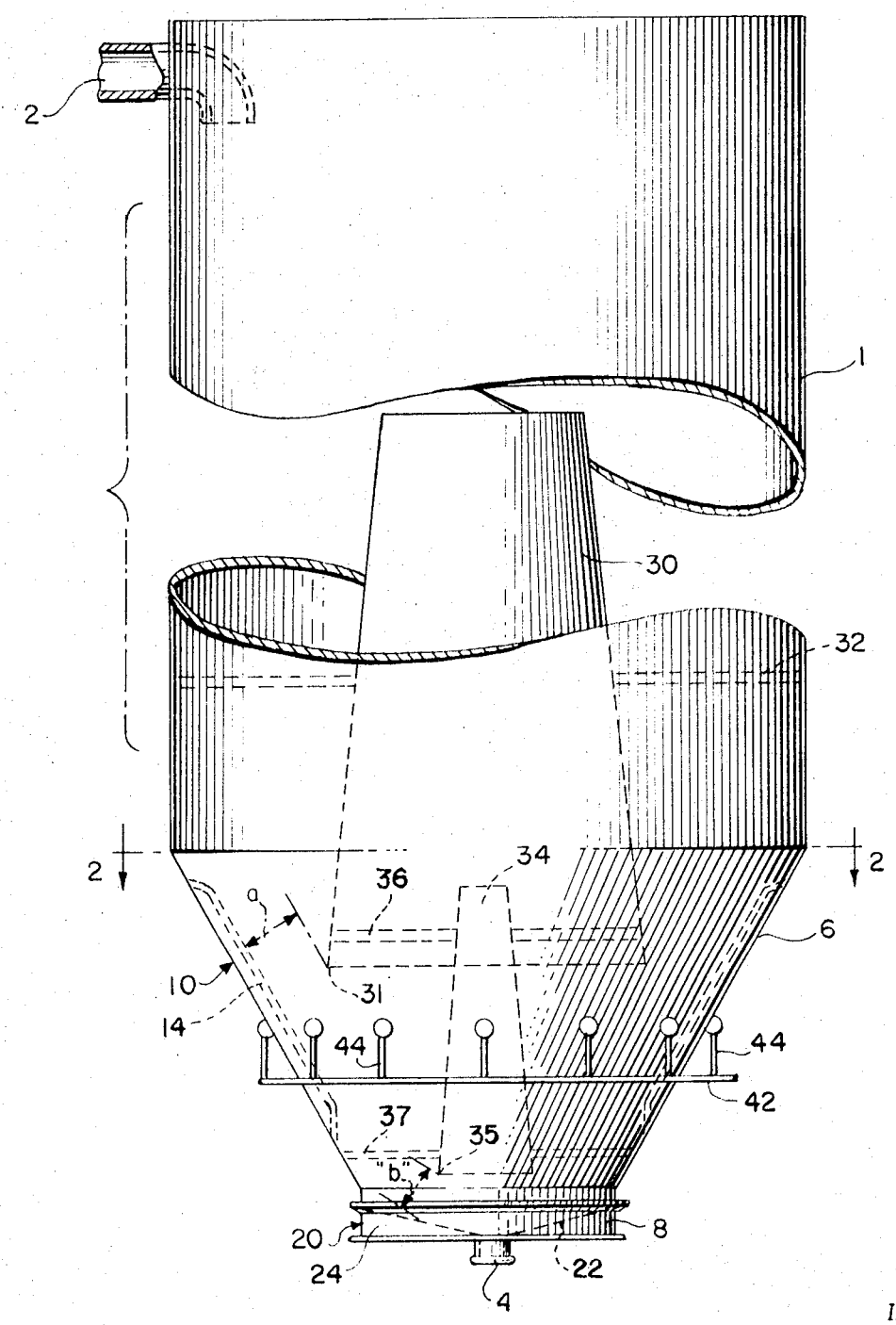
FIG. 1 is an elevational view partly broken away showing one embodiment of the blending apparatus of the present invention.

Referring to the embodiment shown in FIG. 1, the blending apparatus of the present invention includes a blending silo generally indicated at 1 having a material inlet 2 and a material outlet 4. The silo is provided with a conical portion 6 in its lower end and a generally horizontal bottom 8.

A gas permeable divider means generally indicated at 10 is positioned in the conical portion 6 of the silo 1 dividing the vessel into a material chamber and a first plenum chamber means. In the embodiment shown, the gas permeable divider means includes a plurality of circumferentially spaced gas permeable walls 14 defining a plurality of individual plenum chambers 16 circumferentially spaced around the conical portion 6 of the vessel 1. Each of these chambers 16 is divided into sections by partitions 18. If desired, the divider means may extend completely around the conical portion 6 to define a single large plenum chamber.

A second plenum chamber means generally indicated at 20 is positioned in the bottom 8 of the silo 1 and includes a gas permeable wall means 22 facing the inside of the vessel. The bottom of the silo and the wall means 22 define a plenum chamber 24 for receiving gaseous fluid under pressure.

A large diameter blending column 30 is mounted within the silo 1 by means of suitable mounting brackets 32. The column 30 is generally vertically disposed and is spaced from the walls of the silo 1 and the divider means 10. The column 30 is in the shape of a frustum of a right circular cone as shown in my prior copending U. S. Patent application Ser. No. 94,137, filed Dec. 1, 1970, now U.S. Pat. No. 3,648,985. A second blending column 34 is mounted in the conical portion 6 of the silo 1 by means of mounting brackets 36 and 37. The column 34 is smaller then the smallest diameter of the column 30 and extends into the bottom column 30. The column 34 extends downwardly towards the second plenum chamber means 20.

Gaseous fluid under pressure is supplied from a source such as a compressor or blower 40 (FIG. 5) through a conduit 42 to a plurality of conduits 44 each of which is connected to one of the plenums 16. The conduits 44 are connected to a pipe 46 which is positioned in the plenum 16 and is provided with a plurality of spaced apart orifices 48 for supplying gaseous fluid under pressure to each of the sections of the plenum chamber 16. The gaseous fluid under pressure supplied to the sections of the plenum 16 passes through the gas permeable wall means 14 into the material chamber of the vessel to aerate material in the material chamber.

Gaseous fluid under pressure is supplied from a second source 50 (FIG. 4) through a conduit 52 to a plurality of conduits 54 each of which is connected to the plenum chamber 24. The gaseous fluid supplied to the plenum chamber 24 is such that when it passes through the gas permeable wall 22 it is at a higher velocity than the gas which passes through the gas permeable divider means 10. The gaseous fluid which passes through the wall 22 is directed into the bottom of the blending columns 30 and 34. The higher velocity gas supplied to the blending columns causes material in the blender 1 and columns 30 and 34 to flow upwardly through and out the top of the columns. Material outside the columns is drawn into the bottom of the columns. The flow of material through the columns causes a circulation of material through the blender and thus blending of pulverulent material is achieved. Material which flows upwardly through blending column 34 will spill into blending column 30 and thus be circulated upwardly through the entire blender.

In order to utilize the full capacity of a large size air lift blending apparatus, it is necessary to supply to the blending column the full amount of material which is capable of flowing through the blending column. The amount of material which will flow through the blending column is determined by the cross-sectional area of the top of the upper blending column 30. In order to supply sufficient material to the blending column 30, it has been found that it is necessary to make the inlet to the blending column 30 at least as large as the outlet or upper end of such column. The inlet to the blending column 30 is defined by the annular space between the lower edge 31 of the blending column 30 and the gas permeable wall means 14 in a plane normal to the gas permeable wall means 14. Such area has been indicated by the letter $a$ in FIG. 1. In order for this area $a$ to equal the cross-sectional area of the top of the blending column 30, the column 30 must be spaced a certain minimum distance from the bottom of the silo. For large capacity blending silos, such spacing will leave a large area between the bottom of the blending column 30 and the bottom of the silo. During blending operations, this large space between the bottom of the column 30 and the bottom of the silo will often be a dead space where little or no material movement will take place. A lack of material movement in this space will result in a lack of blending of material in this space.

In order to overcome this deficiency, I have added the small blending column 34. This blending column is spaced from the gas permeable wall means 22 by a distance such that the area of the annular space $b$ between its bottom edge 35 and the wall 22 is at least equal to the cross-sectional area of the top or outlet of the column 34. This smaller column serves to blend the material in the space between the bottom of the large column 30 and the bottom of the silo 1. When material is being blended, the material in the lower portion of the silo will flow upwardly through the column 34 and spill into the column 30. From there the high velocity air supplied through wall 22 will pick up such material and lift it through the column 30. Thus, it should be apparent that complete blending of all material is these large capacity silos can be achieved.

In certain instances, it may be desirable to supply gaseous fluid under pressure directly to the smaller diameter blending column 34 without passing through the gas permeable wall 22. For such applications, gas under pressure may be supplied from the supply 50, through conduit 52 into conduit 56 and directly to the outlet 4 of the silo. A valve 57 may be positioned in the conduit 56 for controlling such air supply. A check valve means 58 is positioned in the conduit 56 so that when the silo is being emptied, material will not enter the air supply system.

Figure 6:
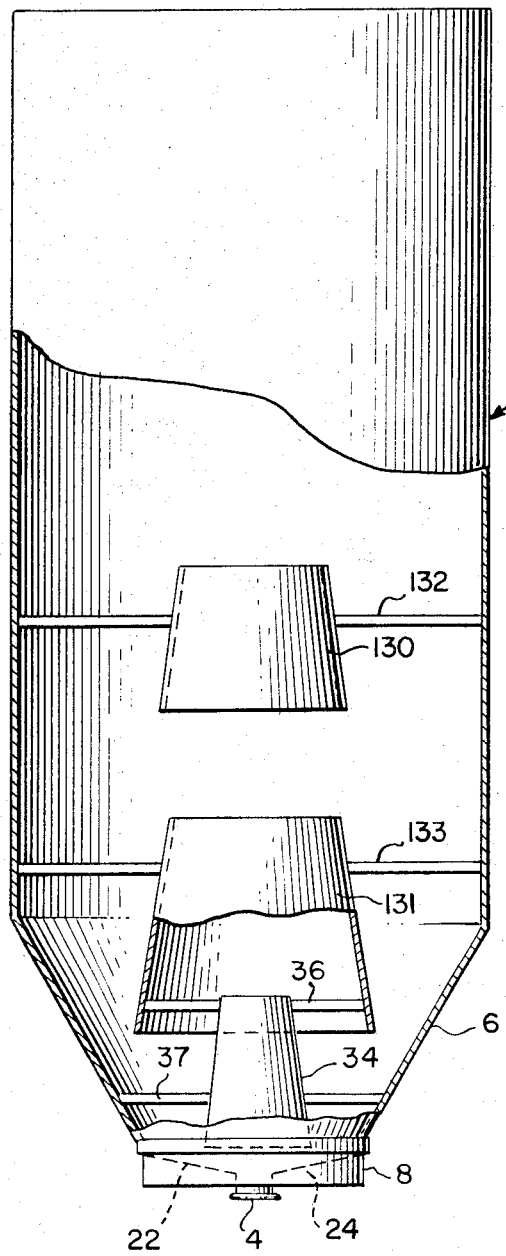
FIG. 6 is a view similar to FIG. 1 showing a second embodiment of the present invention.

In sizing a blender of this type, the vessel and main blending column will be dimensioned so that when the vessel is filled and material therein is aerated by gaseous fluid from the plenums 16, the depth of material in the vessel will be slightly greater than the height of the column 30. The dead depth of material should be less than the height of the column 30. If it is desired to blend less than the design capacity of the blender, a thorough material blend could not be achieved with prior blending apparatus of the type set forth in the present application. In the embodiment shown in FIG. 6, I have shown apparatus which is capable of blending less than a full batch of material. In this embodiment, the large blending column 30 of FIG. 1 has been divided into a pair of blending columns 130 and 131 which are spaced a suitable distance apart and supported by braces 132 and 133, respectively. If it is desired to blend less than a full batch of material, e.g., a half batch, a quantity of material is placed in the blender so that aerated depth of the material is between the two blending columns 130 and 131. If it is desired to blend a full batch of material, material is supplied to the silo 1 until its aerated depth is at a level above the column 130. If desired, a separate air supply may be directed into the uppermost blending column 130. Also, if desired, additional separate blending columns such as columns 130 and 131 may be positioned in the silo 1 to permit greater subdivision of the amount of material which may be blended. In such case, it may be desirable to provide a separate air supply directed into each of these blending columns. Although the blender of FIG. 6 has been illustrated as employing a small blending column 34, in certain applications, it may not be necessary to use this column.

From the foregoing, it should be apparent that the objects of this invention have been carried out. Apparatus has been provided for blending pulverulent material which is particularly useful in large capacity blending systems. Apparatus has been provided which is capable of blending less than a full batch of material.

It is intended that the foregoing description by merely that of a preferred embodiment and that the invention be limited solely by that which is within the scope of the appended claims.

I claim:

1. Apparatus for blending particulate material comprising:
   an upright vessel having a material inlet and a material outlet;
   gas permeable divider means mounted in said vessel and dividing said vessel into a material chamber and a plenum chamber;
   at least two substantially coaxially aligned blending columns mounted in said material chamber and spaced from said divider means;
   means for supplying gaseous fluid under pressure to said plenum chamber for passage through said divider means for aerating material in said material chamber; and
   means for supplying gaseous fluid under pressure into the bottom of at least one of said blending columns at a velocity greater than the gaseous fluid which passes through said divider means for aerating material whereby material flows upwardly through said blending columns.

2. The apparatus of claim 1 wherein one of said blending columns is positioned above the other of said blending columns.

3. The apparatus of claim 2 wherein the bottom of the upper blending column is spaced from the upper end of the lower blending column.

4. The apparatus of claim 3 wherein each of said blending columns is in the shape of a frustum of a right circular cone.

5. The apparatus of claim 4 wherein said means for supplying gaseous fluid under pressure to said blending columns includes a second plenum chamber means having a gas permeable wall means facing the inside of said vessel and positioned below said divider means.

6. The apparatus of claim 5 wherein said lower blending column has a diameter smaller than the smallest diameter of said upper blending column.

7. The apparatus of claim 2 wherein the lower blending column at least partially extends into the bottom of the upper blending column.

8. The apparatus of claim 6 wherein each of said blending columns is in the shape of a frustum of a right circular cone.

9. The apparatus of claim 8 wherein said means for supplying gaseous fluid under pressure to said blending columns includes a second plenum chamber means having a gas permeable wall means facing the inside of said vessel and positioned below said divider means.

10. The apparatus of claim 2 wherein the area of the annular space between the outer periphery of the bottom of the upper blending column and the gas permeable divider means in a plane normal to the gas permeable divider means is at least as large as the cross-sectional area of the top of the upper blending column.

11. The apparatus of claim 1 wherein there are at least three coaxial blending columns, the lowermost blending column extending at least partially into the adjacent blending column and the uppermost blending column being spaced from the adjacent blending column.

12. The apparatus of claim 11 wherein each of said blending columns is in the shape of a frustum of a right circular cone.

13. The apparatus of claim 12 wherein said means for supplying gaseous fluid under pressure to said blending columns includes a second plenum chamber means having a gas permeable wall means facing the inside of said vessel and positioned below said divider means.

* * * * *